United States Patent [19]
Cezar

[11] Patent Number: 6,128,651
[45] Date of Patent: Oct. 3, 2000

[54] INTERNET ADVERTISING WITH CONTROLLED AND TIMED DISPLAY OF AD CONTENT FROM CENTRALIZED SYSTEM CONTROLLER

[75] Inventor: Robert M. Cezar, Arroyo Grande, Calif.

[73] Assignee: AmeriCom USA, Arroyo Grande, Calif.

[21] Appl. No.: 09/291,785

[22] Filed: Apr. 14, 1999

[51] Int. Cl.$^7$ .................................................. G06F 13/00
[52] U.S. Cl. ......................................................... 709/217
[58] Field of Search .................................. 705/1, 14, 26, 705/27, 79; 707/500; 709/200, 203, 217, 218, 219, 224, 227, 229

[56] References Cited

U.S. PATENT DOCUMENTS

| | | | |
|---|---|---|---|
| 5,710,887 | 1/1998 | Chelliah et al. | 705/26 |
| 5,712,979 | 1/1998 | Graber et al. | 709/224 |
| 5,717,860 | 2/1998 | Graber et al. | 709/227 |
| 5,721,827 | 2/1998 | Logan et al. | 709/217 |
| 5,724,424 | 3/1998 | Gifford | 705/79 |
| 5,727,156 | 3/1998 | Herr-Hoyman et al. | 709/219 |
| 5,737,619 | 4/1998 | Judson | 707/500 |
| 5,740,549 | 4/1998 | Reilly et al. | 705/14 |
| 5,751,956 | 5/1998 | Kirsch | 709/203 |
| 5,757,917 | 5/1998 | Rose et al. | 705/79 |
| 5,933,811 | 8/1999 | Angles et al. | 705/14 |
| 5,937,392 | 8/1999 | Alberts | 705/14 |
| 5,948,061 | 9/1999 | Merriman et al. | 709/219 |

FOREIGN PATENT DOCUMENTS

| | | |
|---|---|---|
| 0749081A1 | 12/1996 | European Pat. Off. . |
| WO 97/21183 | 6/1997 | WIPO . |

OTHER PUBLICATIONS

"Internet access: Internet marketing revolution begins in the U.S. this Sep.; Hyper System promises new cash flow for providers, free access for users, & new marketing opportunity for businesses." Computer Select, *Edge: Work–Group Comuting Report*, 7(316):2 (1996).

"NetGravity Announces AdServer 2.0, Raises the Standard in Online Advertising management Software," Website: NetGravity, http://www.netgravity.com/press/as20launch.htm, Oct. 14, 1996.

Booker, E., "Seeing A Gap, A Palo Alto Startup Will Debut Advertising Server for the Net," Website: internet.com, http://www.internetworld.com/print/1996/02/01/industry/ad–server.html, Web Week, vol. 2, Issue 2, Feb. 1996.

(List continued on next page.)

*Primary Examiner*—Robert B. Harrell
*Attorney, Agent, or Firm*—Townsend and Townsend and Crew LLP

[57] ABSTRACT

A non-scrolling ad display is lodged in a website to cause browsers hitting the website to undertake centrally controlled and recorded ad display for guaranteed minimum timed intervals. The system enables precise controlled advertising to each web page viewing browser and accurate advertising budgeting and programming which can be monitored and upgraded to meet marketing needs. The components participating in the system include a website at a webserver for transmitting a page with code for installing a non-scrolling ad frame. Ad content for the non-scrolling ad frame each have individual timers for timing out commencing with display at the browser and an Internet address for fetching by the browser. A central controller with a firewall protected data base directs non-scrolling frame set up in the browser; generates, dispenses and interrogates for unique browser identifiers; maintains records associated with the unique browser identifiers indicating ads displayed and ads available for display; and, finally dispatches to inquiring browsers ad content addresses. The data base provides an audit trail from which websites can be compensated for ad display and advertisers billed for the ad display. Finally, an inquiring browser has the non-scrolling frame set up on the browser, ad content displayed within the browser for a sufficient time interval to timeout the timer, report to the central controller of the display, and retrieval of the address of the next ad content for display.

19 Claims, 4 Drawing Sheets

OTHER PUBLICATIONS

Kohda, Y. and Susumu Endo, "Ubiquitous advertising on the WWW: Merging advertisement on the browser," *Computer Networks and ISDN Systems*, 28:1493–1499 (1996).

Metcalfe, B., "From the Ether," Website: InfoWorld Electric, http://www.infoworld.com/cgi–bin/displayArchive.pl?/96/33/o04–33.48.htm, vol. 18, Issue 33, Aug. 12, 1996.

INTERNET ADVERTISING WITH CONTROLLED AND TIMED DISPLAY OF AD CONTENT FROM CENTRALIZED SYSTEM CONTROLLER

This invention relates to Internet advertising. More particularly, a frame on website displays controlled and timed ad content under the control of a centralized system controller.

BACKGROUND OF THE INVENTION

It has now become common to load web pages with paid advertising. For example, it is common to see advertisements and web page linked advertisements on many web pages. Simply stated, with a web page linked advertisement, by "clicking" on the ad, forwarding of the browser to the relevant web page of the advertiser occurs.

In a typical advertising supported website, an advertiser supplies ad copy electronically to a website operator. The website operator owns and/or controls a computer or collection of computers knows as the webserver. The website operator creates one or more hyperlinked pages and stores those pages on the webserver, preferably with the ad copy included, or referenced, in one or more of the hyperlinked pages.

A user of a browser that is interested in the website will direct his browser to connect to the webserver and retrieve one or more pages of the website. As the browser displays the pages for the user, the browser displays the ad copy, by virtue of the fact that the website operator included the ad copy in the website pages being viewed.

Unfortunately, the advertiser placing the ad has little control over how the ad is viewed. For example, many web pages are larger than the screen that displays the pages. This being the case, the pages are typically scrolled, and with the scrolling of the pages, the ads are likewise scrolled. Such scrolling brings the ads into and out of view, on a basis where both the advertiser and the agency placing the ad have no control over when the ad is being viewed.

A known solution to scrolling is to place the ad content in a non-scrolling frame. In such an ad, the non-scrolling frame and the ad content is constantly located with respect to the viewed screen of the browser. Thus, both the agencies placing the ad and the advertisers are relatively sure that the ad remains where it may be viewed.

Unfortunately, there is a downside to utilizing a non-scrolling frame. Specifically, one of the most important ways a website is enabled to have life sustaining "hits" to be indexed with certain general search sites. These general search sites take in the subject matter sought, a name, or combinations of words and direct the inquiring browsers likely websites having the desired information sought. Many such general search sites take information from robotic searchers—searching computer programs that essentially with minimal tending systematically visit and then index websites and the subject matter contained or referred to within the website. It is required that these search engines be able to freely move from website to website to continue their searching and indexing task.

Non-scrolling frames present on a website serve to trap such search engines at a particular website and prevent the search engines from moving on to the next website. The presence of the frame gets the engine caught on the site in a recursive cycle that prevents further search engine movement from the website without time-consuming manual intervention. A solution commonly adapted by designers of search engines is to quickly scan the site for the presence of a frame. Finding a frame, the search engine moves on without further interrogation of the website—and more importantly for the owner of the website—without adding the website to the index. In other words, heretofore, placement of a non-scrolling frame within a website excludes that website from many indexes. And being excluded from many indexes, the website is isolated from what otherwise might be a larger number of revenue earning hits. It therefore become understandable that frames—especially non-scrolling frames—within websites are avoided.

The time of ad content view is another problem. Taking the same situation of a non-scrolling frame, ad content is often changed within the frame on a periodic basis. This change is either programmed or random by the website with respect to any given ad. Since only the website controls the ad content, both the programmed or random display of ad content continues indefinitely so long as the browser remains on the website.

SUMMARY OF THE INVENTION

A webserver delivers web pages to a browser while a central controller tracks the extent to which a particular ad is presented to a particular browser. The coding for the web pages is such that the ad does not scroll during browser display of a web page. The content of the ad includes a coded timer, which upon timeout causes the browser to report to the central controller. The system enables precise controlled advertising to each web page viewing browser and accurate advertising budgeting and programming from the central controller. As a consequence, browser advertising is generated which advertising can be monitored and upgraded to meet marketing needs.

The components participating in the system include a host website partition at a webserver for transmitting a page. The webserver transmits software to the browser for retrieving a non-scrolling ad frame. Ad content for the non-scrolling ad frame has individual timers for timing out each ad. The timers starts commencing with display at the browser. A central controller with a firewall protected data base directs non-scrolling frame set up in the browser; generates, dispenses and interrogates for unique browser identifiers; maintains records associated with the unique browser identifiers indicating ads displayed and ads available for display; and, finally dispatches to inquiring browsers ad content addresses. The data base provides an audit trail from which websites can be compensated for ad display and advertisers billed for the ad display. Finally, an inquiring browser has the non-scrolling frame set up on the browser, ad content displayed within the browser for a sufficient time interval to timeout the timer, report to the central controller of the display, and retrieval of the address of the next ad content for display.

A subscribing website transmits code that diverts initial browser call to a central controller to retrieve a non-scrolling frame followed by reconnection to the website for continued page loading. Initially, a lead-in ad with timer is loaded from the website to the non-scrolling ad frame and displayed until the timer times out.

It is important to note that the non-scrolling frame never appears at the website; the non-scrolling frame only appears at the browser. This being the case, search engines servicing general search sites are free to come, analyze, and index the contents of the website. Since the non-scrolling frame only appears at the browser—and never at the website—the robotic search engines are neither trapped recursively within the site nor avoid the site because of the presence of a frame.

During timeout of the lead-in ad timer, the central system controller interrogates for a central system controller identifier. Presuming that on first call the browser lacks the central system controller identifier, a unique central system controller identifier is generated at the central controller for the browser together with an address of first ad content to be displayed at the non-scrolling ad frame. Upon lead-in ad timeout, lodging of the unique system controller identifier to the browser occurs with the transmission of the address of the first ad content to be displayed. The browser then fetches the first ad content, displays the first ad content with the display starting a timer within the first ad content. Upon timeout of the timer of the first ad content, the browser makes a return and report to the central system controller in a record associated with the unique central system identifier.

The record associated with the central system identifier is accounted relative to the particular ad content displayed and timed out. For example ad content available for display will be altered noting that one ad has been displayed and timed out. Further, the ads available for display will be altered. This record of the ads available for display as updated by the report is then used to transmit to the reporting browser the address of the next in order ad content and timer for display. The process repeats until the browser leaves the website and resumes when the browser returns to the website.

The system uniquely uses the browser in a scheme of precise timed ad display control. First, the browser is loaded with code, which code interrogates for the presence of the non-scrolling ad frame. If the browser lacks the non-scrolling ad frame, the browser is diverted to the system controller to load the non-scrolling ad frame. the non-scrolling frame never appears at the website. Second, the browser initiates timer running as each ad is displayed. Thus, the advertiser is assured that his particular ad content is displayed for the required minimum time interval. Third, the browser inquires to the central controller for the ad content addresses to be displayed. Thereafter, it is the browser that fetches and loads the ad content to the non-scrolling ad frame on any displayed web page; this minimizes bandwidth transmission at the central controller. Fourth, the browser reports to the system controller the time out of displayed ad content, enabling a precise record of advertising control to be maintained.

The system uses the website minimally in its scheme of precise timed ad display control. The only modification required of the website is that it transmits initial Java code to the inquiring browser to commence running of the system.

Finally, the central system controller enables precision targeted advertising with accountability to the website and proof of advertisement display to the paying advertiser. The central system controller maintains a large database. This large data base includes the unique identifier of each inquiring browser and data for ad content including ad content identity and assurance of the number of times that the identified ad content has been displayed to a browser for a minimum timed interval. This large database, automatically generated as a necessary control for the distributed advertising, generates an audit trail, which can be used for compensation of the website and a billing record for the controlled and distributed advertising.

DESCRIPTION OF THE SPECIFIC EMBODIMENTS

Figure 1:
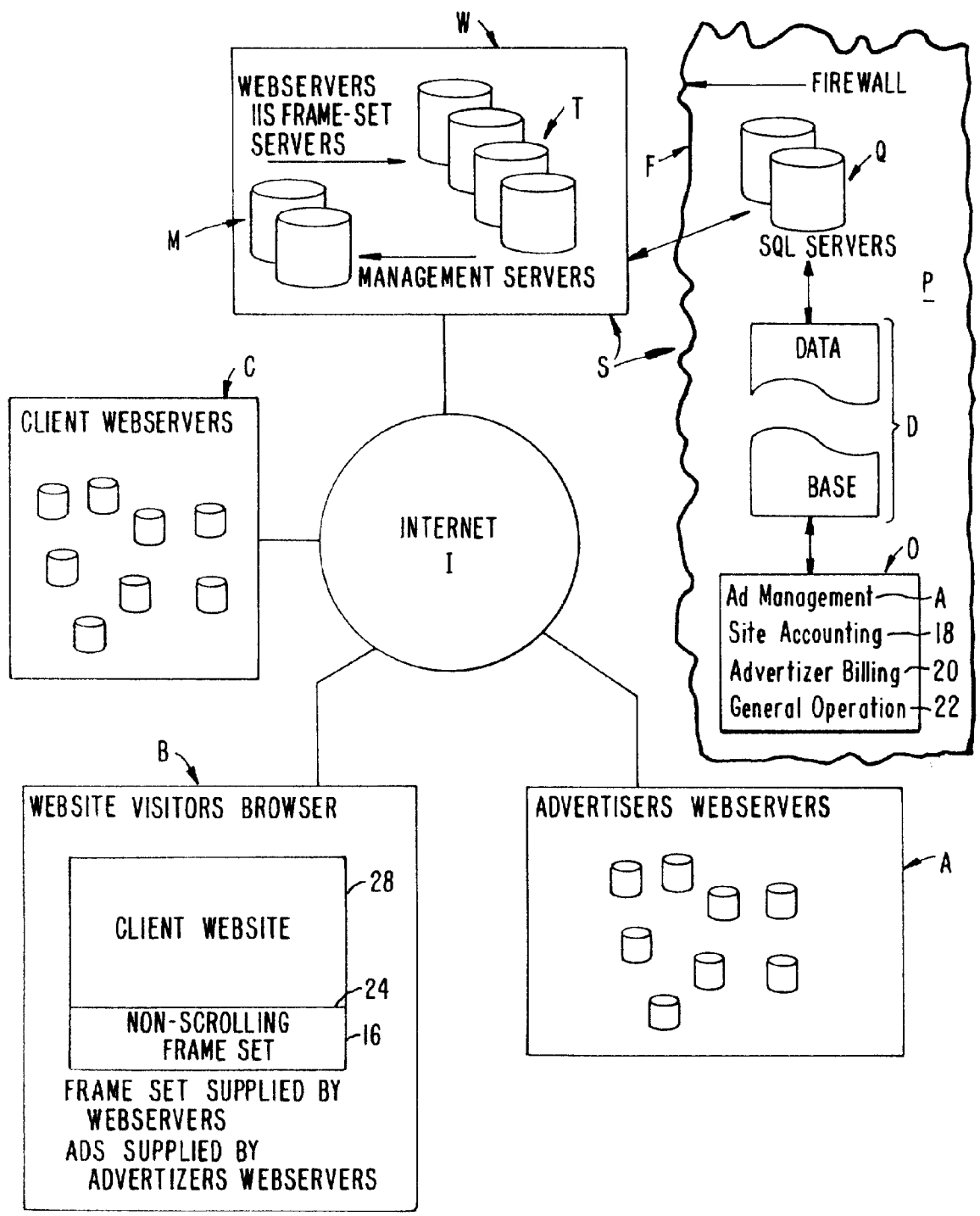
FIG. 1 is a schematic of the Internet with the components connected for the necessary practice of this invention including a website with webserver, a displayed web page having a non-scrolling frame set; an inquiring browser; an advertising webserver and finally an Internet system controller having a fire wall protected Standard Query Language (SQL) server and data base.

Referring to FIG. 1, the components required for the practice of this invention are schematically illustrated with respect to their connection to the internet I.

System controller S includes two major component parts; webservers W and central processor P. Central processor P is isolated from internet I by firewall F. Within firewall F this system includes SQL servers Q which execute and maintain data base D, a running "real time" record which has output O.

Utilizing database D, SQL servers Q provide first ad management 14. This ad management controls the particular ad content 16 displayed on any browser B.

Second, site accounting 18 is provided. Site accounting 18 is a record of total time interval of the many ad contents 16 that may be displayed through advertiser webservers C. This record may be used to compensate each of the advertiser webservers C for the total time of ad display to particular browsers B.

Third, database D is used for advertising billing 20. As will hereafter become apparent, the identity of the ad content displayed and the identity of the particular browser B are maintained in a record. This record has the ads available for display, those ads already displayed, and the identifier of the particular browser B on which the ads were displayed. Utilizing this record, advertisers can be billed for the services that the system renders.

Fourth, database D is used for general system operation 22. This general system operation can include alteration of the number of times that ad content 16 is displayed, the classification of ad content 16, the time of day of display of ad content 16 and virtually any desired parameter which an advertiser would prefer to control.

System controller S also includes two sets of differing servers connected to Internet I. First, there are frame set servers T. Frame set servers T are interactively called when a browser B calls on a advertiser webservers C for the first time. The inquiring browser B is interrogated for the presence of a non-scrolling ad frame 24. Lacking the presence of non-scrolling ad frame 24, the inquiring browser B is diverted to frame set servers T and non-scrolling ad frame 24 installed on the browser B. Once this interrogation has taken place, inquiring browser B is returned to the particular advertiser webserver A on which call was first made, the interrogation repeated, non-scrolling ad frame 24 found, and display of ad content 16 begun with a so-called lead-in ad content 16' from the particular advertiser webserver C. Frame set servers T also supply the Internet addresses and code that appears in the Appendix.

Frame set servers T handle on line active management of the advertising ad content 16. These servers allow outside management to call in and tailor with immediacy the particular ad campaign being run. As far as the disclosure of this invention is concerned, these servers will not further be discussed.

Advertiser webservers C have the ad content 16. The browsers B for display at the non-scrolling ad frame 24 fetch this ad content 16.

In the advertising sales of this system, space for non-scrolling ad frame 24 is "rented" from the operator of each advertiser webserver C. Typically, each website is compensated for "making available" placement of the non-scrolling frame 24. By having system controller S control the ad content 16, which is displayed within non-scrolling ad frame 24, the ad management of this invention, occurs.

The reader will understand the use of the term "making available." The non-scrolling ad frame 24 never appears on the advertising webserver C. However, the owner of the advertising webserver C understands that when a browser views his website, that browser will in fact have non-scrolling ad frame 24 present on the browser. Thus, the system gives the advertising webserver C the presence of a "overlaid" non-scrolling ad frame 24, which non-scrolling ad frame 24 never appears on the advertising client webserver C.

Only one browser B is identified in FIG. 1. The reader will understand that many (in the thousands) such browsers B use the system. As will hereafter become apparent, it is particularly important to use the distributed intelligence of browser B to do as much of the "work" for installing the non-scrolling ad frame and for obtaining, timing, reporting, and retrieving ad content 16 displayed within non-scrolling ad frame 24. Thus it is the main purpose of system controller S to control browser B in the installation of the non-scrolling ad frame and in obtaining, timing, reporting, and retrieving of the ad content 16 so that bandwidth at system controller S is appropriately narrowed.

Advertiser webserver C downloads code to browser B. Browser B executes the code and installs the non-scrolling ad frame 24 to the browser only. Thereafter, advertiser webserver C operates normally and without further modification in supplying webpages to the browser B.

Screen 28 of browser B is shown schematically. Once non-scrolling ad frame 24 is installed, lead-in ad content 16' is first displayed. Thereafter, browser B is given identification by system controller S. Under the direction of system controller S, browser B reports ad identity, and time of display for a minimum time interval to system controller S. After this report, browser B is given the Internet address of further ad content 16 to be displayed, fetches this ad content 16 and displays the ad content 16 for the appropriate time interval. As will hereafter become clear, this cycle essentially endlessly repeats for at least as long as one browser B is connected to one advertiser webserver C. As will hereafter be demonstrated, it is possible to trace the same browser B as it visits related (but not the same) advertiser webservers C.

Finally, the reader will note that advertising webservers A are shown. These sites contain ad content 16. It goes without saying that advertising webservers A can be webservers owned by the advertisers themselves. Further, the ad content 16 dispensed by these advertising webservers A can be altered by the advertiser at will—so long as they conform to the format of this advertising system. Thus it is possible to give the advertiser direct control of ad content and ad duration used with this system.

Figure 2:
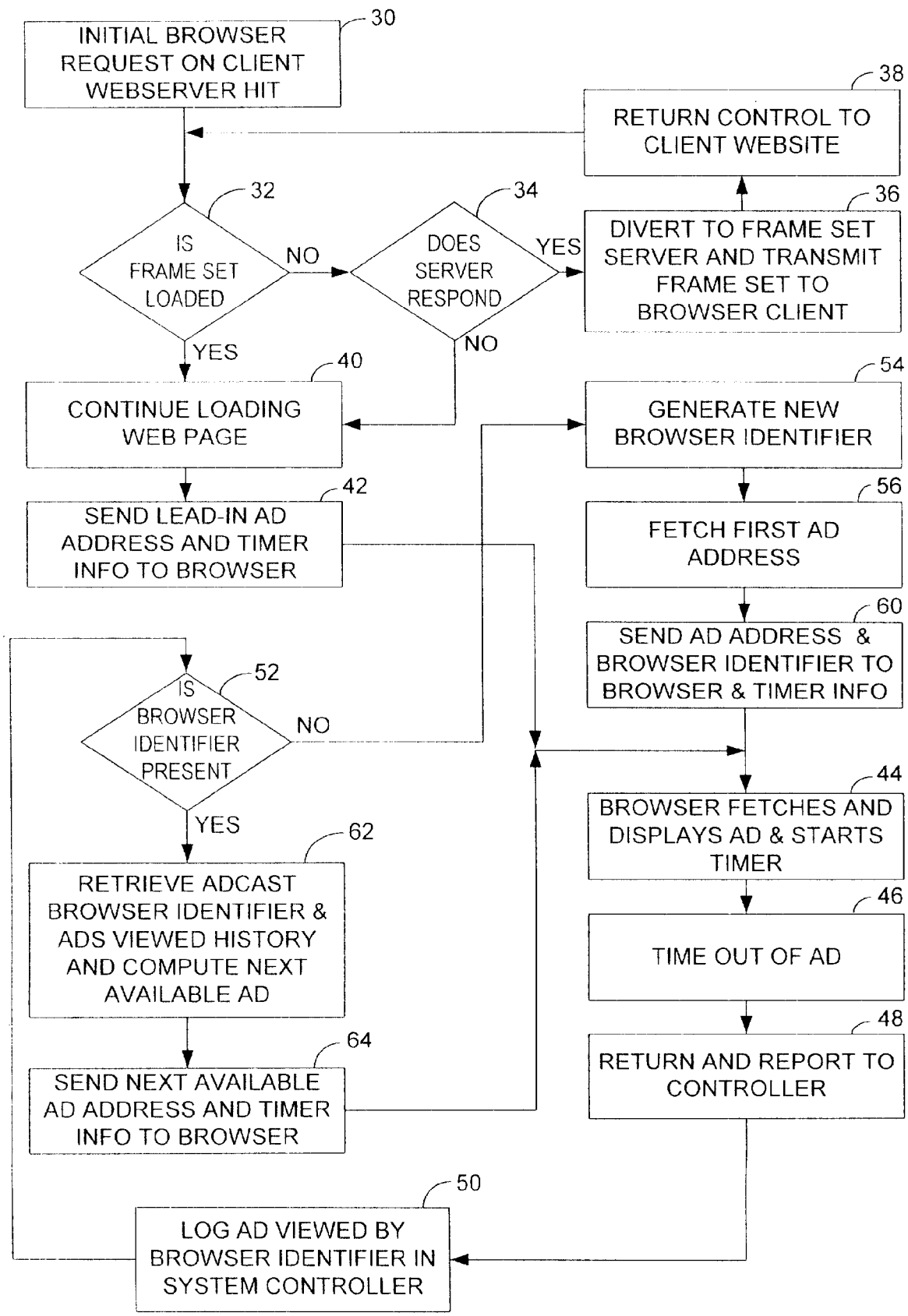
FIG. 2 is a logic diagram of the Internet interaction between the components illustrated in FIG. 1 illustrating the logic followed as the browser makes its first contact or "hit" with the system of this invention, emphasizing in particular the use of the browser to undertake obtaining and displaying the controlled advertising.

Having set forth the components utilized with this invention, description of operation will be set forth with respect to FIG. 2, utilizing an initial inquiry of browser B to a advertiser webserver C. The interaction of the browser B, the advertiser webserver C, and the system controller S will be explained.

Thereafter, the method of prioritizing and controlling the individual ad content 16 displayed will be discussed with respect to FIG. 3. Together with FIG. 1, this in large measure explains the logic of system controller S in so far as pertinent to this disclosure.

Figure 4:
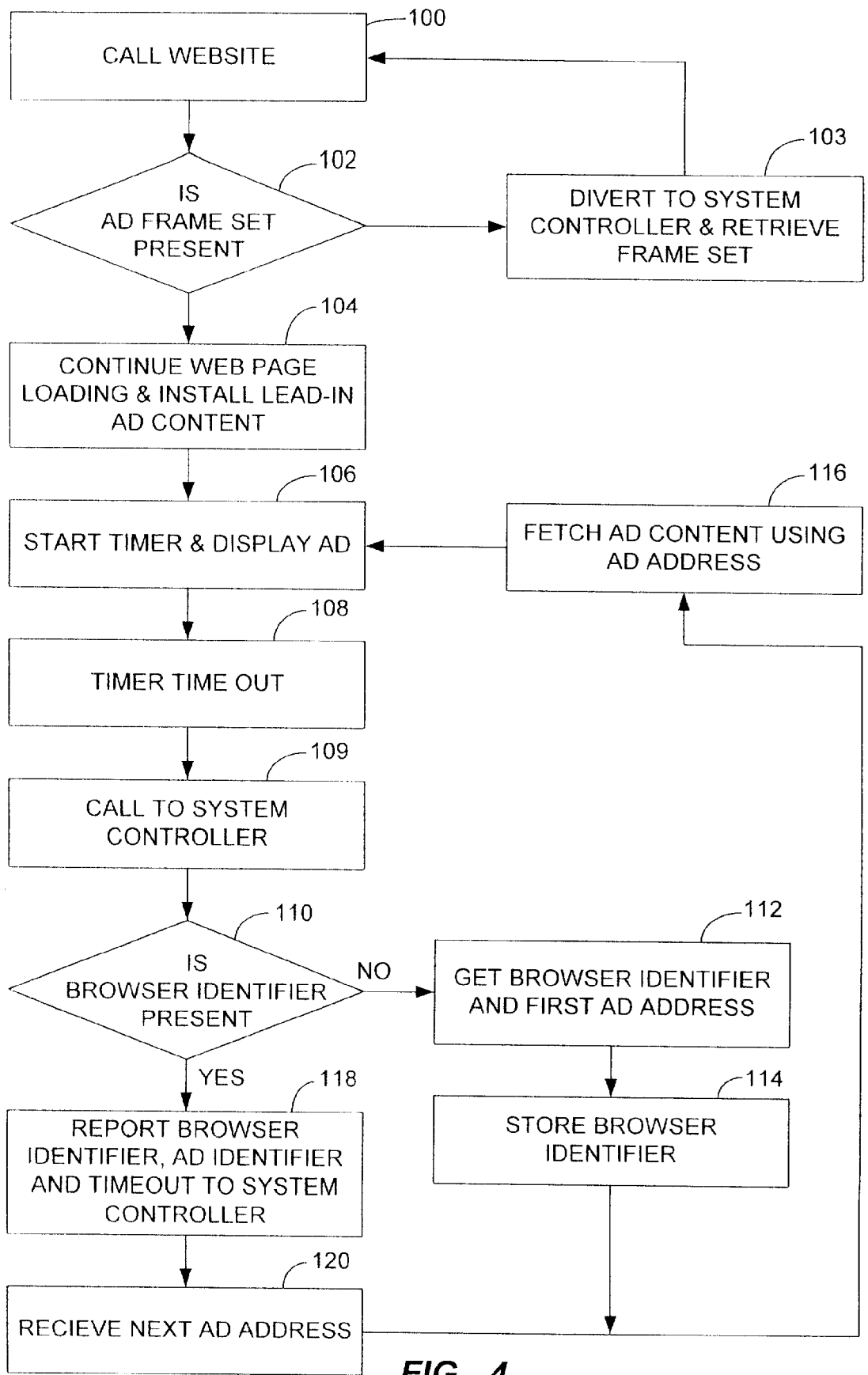

The browser will be set forth with respect to FIG. 4. It will be shown in the advertising scheme here, each browser B and its local intelligence is extensively utilized.

Referring to FIG. 2, an overall flow chart of system logic is set forth. This flow chart is descriptive of the entire process utilizing distributed intelligence through Internet I.

Starting of the process occurs with initial webserver hit 30. At this point, browser B has made an Internet call on advertiser webserver C. Code is loaded from the advertiser webserver C to interrogate at step 32 whether non-scrolling ad frame 24 is loaded to browser B.

Presuming that non-scrolling ad frame 24 is not loaded, the code loaded from the advertiser webserver C directs browser B to call on system controller S at frame set servers T. Presuming that these frame set servers T respond 34, non-scrolling ad frame 24 is then loaded to browser B by system controller S from frame set servers T. Frame set loading step 36 is followed by return of browser B under the direction of system controller S to advertiser webserver C.

The reader will understand that the code loaded by the advertiser webserver C is Java script code, which code executes immediately upon being loaded to the browser B. At the same time, the presence of this code is transparent to any robotic search engines searching in the HTML language. Therefore, the advertising webserver C can cause a non-scrolling ad frame 24 to appear at browser B only, while the advertising webserver C never itself contains such a non-scrolling ad frame. Thus the non-scrolling ad frame 24 is "overlaid" on the website only, it is never actually present on the website.

It is well known that browser B often "cache" in memory webpages. The reader will understand that such a "cached" page can retain the "overlaid" non-scrolling ad frame. If this is the case, on a second call at an advertising webserver C where the composite image of the webpage and the non-scrolling ad frame is preserved, the disclosed logic will enable the step of separate loading of the non-scrolling ad frame 24 from the system controller S.

The code delivered by the advertiser webserver C then again conducts interrogation 32 with browser B responding that non-scrolling ad frame 24 is present in browser B. Web page loading 40 continues; it being noted that if system controller server response 34 does not affirmatively respond, again web page loading 40 will continue.

It is required that advertiser webserver C include at least one lead-in ad content 16'. Like all other ad content 16, this lead-in ad content 16' contains a timer—say in the order of 30 seconds. Thus between browser B and advertiser webserver C the lead-in ad content 16' is transmitted at lead-in ad content transmission step 42.

When lead-in ad content transmission step 42 occurs from advertiser webserver C to browser B, lead-in ad content 16' is displayed within non-scrolling ad frame 24 at display and timer start step 44. As lead-in ad content 16' has a timer, display continues while the timer times out at timeout step 46.

At this juncture, a portion of non-scrolling ad frame 24 software includes return and report step 48 from browser B to system controller S at frame set servers T. At system controller S, display of lead-in ad content 16' is logged at ad logging step 50.

Presuming that browser B has made its initial hit into the system of this invention; it will be understood that no identifier (or cookie) is present. Accordingly, ad logging step 50 between browser B and system controller S will fail and system logic will pass to identifier present step 52.

Presuming further that no identifier (or cookie) is present, system controller S through frame set servers T will generate an identifier at identifier generation step 54. At the same time, the address of the "first" ad (it being remembered that the lead-in ad content 16' timed out) will be fetched at fetch first ad address step 56. This address will be transmitted between system controller S and browser B. Once browser B has received both the system identifier and the first ad address 60, display and timer start step 44 occurs, followed by return and report step 48 with ad logging step 50 this time being successful.

The remainder of the overall logic is easy to understand. When browser B is interrogated by system controller S for the presence of an identifier at identifier present step 52, the answer will be in the affirmative. System controller S will then have received a report from browser B consisting of that identifier particular to the browser, and the ad content 16 displayed. Further, system controller S through frame set servers T, firewall F, SQL servers Q, and data base D will compute the address of next available ad at address of next available ad step 64. From this point forward, the reader will understand that the entire system is in an endless loop for so long as browser B is on advertiser webserver C.

From what has been said thus far, the reader can understand that records of an ad being shown are only recorded in data base D when they have been on the screen of browser B for a sufficient period of time for the timer associated with ad content 16 to time out. There remains to be explained how the ad content 16 is chosen for display. This is essentially an expansion of next available ad step 64.

Figure 3:
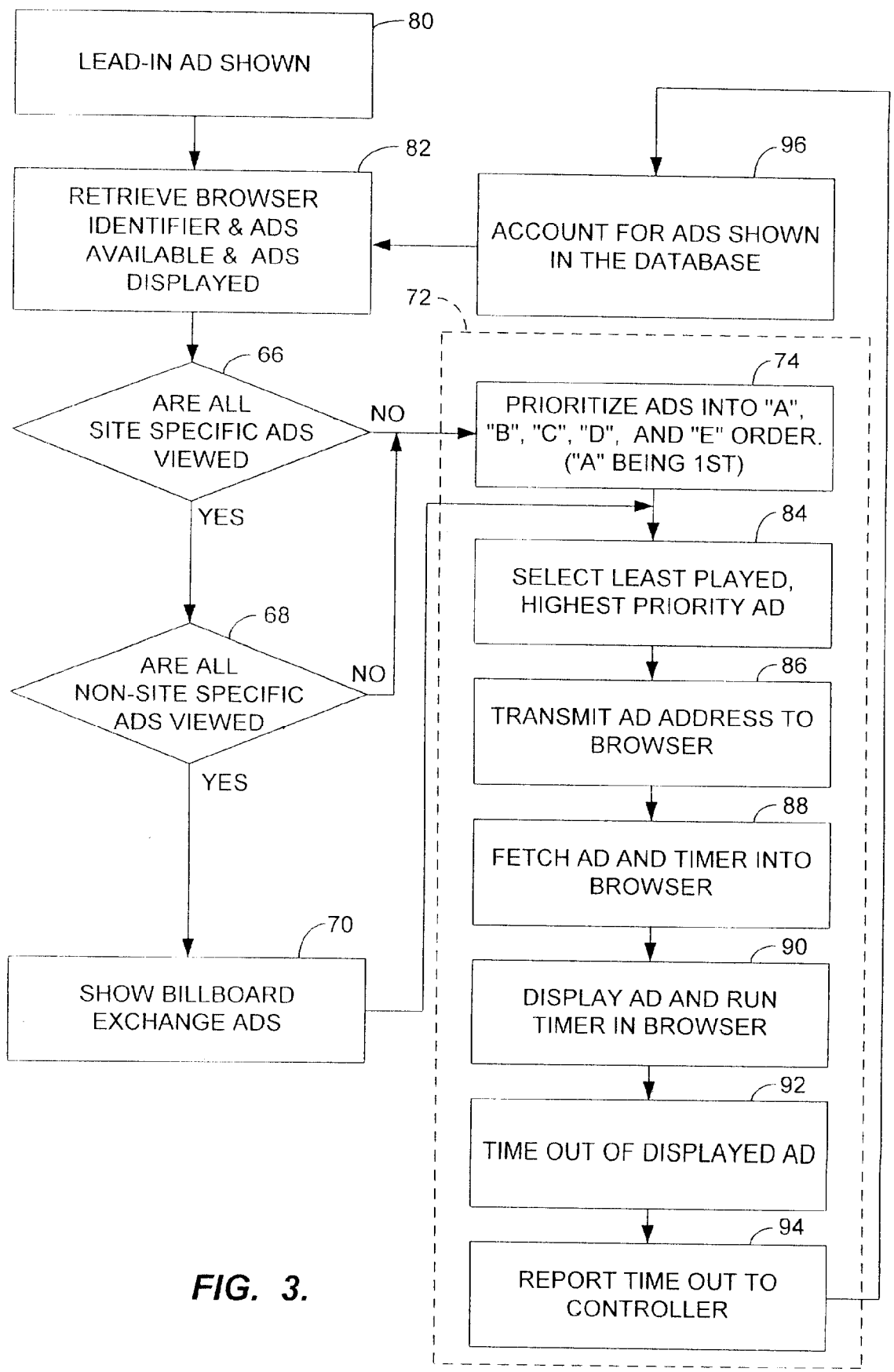
FIG. 3 illustrates the logic used by the central system controller for causing ads to appear in prioritized groups; and, FIG. 4 illustrates the logic used by the browser for the display of the frame advertising in accordance with this invention.

Referring to FIG. 3, it is first necessary to determine the three illustrated ad types (it being noted that one ad type would be sufficient and more than three could be utilized).

First, there is the so-called "site specific ad." Examples of site specific ads could be sporting equipment ads for sports websites; female oriented ads for beauty website, etc.

Second, there are non-site specific ads. These ads could be those with so-called generic appeal like soft drinks, shoes, travel, bookstore ads and the like.

It is to be understood that the above "site specific ads" and "non-site specific ads" are themselves provided with subclasses. For example, site specific ads can be sub-grouped into categories A–E. Presuming that twelve such ads are in each group and the timers are set for 30 seconds—total display time for each ad group will be in the order of one half hour. Further, presuming that the non-site specific ads have equivalent timers and equivalent numbers, total time of non-specific ad display will be 30 minutes with the combined specific and non-specific ads totaling one hour.

Further, presume that advertiser webserver C is a game site. This being the case, some users will stay on advertiser webserver C for more than one hour. This being the case, the so-called "bill board exchange ads" can be shown. Again these ads can be categorized in subclasses A–E—but these ads are typically grouped and administered by the owner of system controller S. Specifically, and as a reward for continued advertising using the system, the presence of one advertiser webserver C can be advertised on another advertiser webserver C in the billboard exchange ad. Thus, ad display of sites will occur in a pattern that is dependent upon volume of advertising running through a site. It is important to note that if browser B chooses to divert to a billboard exchange site, nothing is lost to the owner and operator of system controller S. Instead, the popular site has its presence further advertised to the user of the system.

Having set forth the categories of ads, return will now be made to FIG. 3.

It will be seen that FIG. 3 interrogates for site specific ads at site specific interrogation step 66, and then interrogates for non-site specific ads at non-site specific ad interrogation step 68. Presuming that all these ads are displayed only then will billboard exchange ad protocol 70 initiate.

It is also important to note ad category column 72. The reader will understand that the logic illustrated in ad category column 72 will repeat for the "A" category site specific ads through the "E" category site specific ads. Thereafter, the logic will repeat for the "A" non-site specific ads through the "E" non-site specific ads. As this logic is repetitive, ad category column 72 is shown only once.

Further, the ad categories will be assigned at system controller S at category assignment step 74. Having set forth this preliminary material, return will now be made to the top of FIG. 3.

Remembering the diagram of FIG. 2, it will be realized that lead in ad shown step 80 can occur in one of two ways. First, browser B with an identifier can show lead-in ad content 16' and report the display at ad logging step 50. Alternately, and presuming that browser B has never visited the advertising system of this invention before, the lead-in ad will be played without recorded record. System diversion will occur to identifier generation step 54, fetch first ad address step 56, and first ad address 60. Thereafter, display and timer start step 44, timeout step 46, return and report step 48, and finally ad-logging step 50 will occur.

Once lead in ad shown step 80 has occurred, system controller S at frame set servers T will execute retrieve browser identifier and record step 82. As indicated, the retrieved record will include the identity of all ads available for display as well as the identity of all ads displayed. The former will be used to choose then next ad to be displayed, the latter will be used to both compensate with website owner for ad display as well as bill the advertiser for ad display.

Stopping at this point, the reader will recognize two things about database D. First, this record can be and is very large. Second, access to this large record must occur with great speed. As a consequence, I use firewall F isolated SQL servers Q for the service of this record.

Utilizing the retrieved record, select least played highest priority step 84 is executed at system controller S through frame set servers T. Frame set servers T then transmit ad address to browser 86, it being noted that system controller S could be—but is usually not—the transmitted address. Instead, advertising webservers A address is usually dispensed.

Once browser B has the ad address of advertising webservers A, ad content 16 is fetched—not by the system controller but by browser B at fetch ad content step 88. There after, display ad and run timer in browser step 90 occurs followed by timeout step 92. These steps are the equivalent of steps display and timer start step 44 and timeout step 46 shown in FIG. 2. Finally, report time out to system controller step 94 occurs. In this step, the browser identifier, the ad identity, and the fact of timeout of the ad is reported to frame set servers T, transmitted through firewall F, and entered into data base D through SQL servers Q. This much is schematically indicated at account for ads shown step 96.

Having explained this much, the reader can understand the rest of the sequence. Ads will be sequentially played by site specific or non-site specific category in the particular groups to which they are assigned. It is to be noted that the advertiser can price ads according to the group into which they are categorized. Other flexibilities of this system will be likewise apparent.

It should be understood that in this system, each component independently operates via the Internet. It is an important aspect of this invention to use browser B for as many tasks as possible. Utilizing the distributed intelligence of the otherwise idle browsers constitutes a major aspect of this invention. It is therefore instructive to view in FIG. 4 the logic which browser B undertakes.

The advertising scheme of this disclosure starts when browser B calls advertiser webserver C at call website step 100. Code is transmitted to browser B. The code is run in browser B and inquires of browser B at is non-scrolling ad frame present step 102. Presuming that this is the first call, and no non-scrolling ad frame 24 is present, browser B is diverted to system controller S at frame set servers T at installation of non-scrolling ad frame step 103. Frame set servers T undertake the installation of non-scrolling ad frame 24 for display on screen 28 of browser B. Upon completion of the momentary exercise, browser B is diverted back to advertiser webserver C.

When diversion back to advertiser webserver C occurs, again browser B is queried for the presence of non-scrolling ad frame 24 at is non-scrolling ad frame present step 102. This time the test is passed and continues loading of WebPages and display lead-in ad step 104 occurs. Thereafter, when lead-in ad content 16' is loaded, display and timer start step 106 occurs. This is followed by timer timeout step 108. Finally, and using the short software routine loaded from frame set servers T, browser B calls system controller S at frame set servers T at call system controller step 109.

When connection is made between frame set servers T and browser B, system controller S queries browser B for the presence of a system identifier (cookie) at identifier present step 110. Presuming that this is the first call of browser B into the advertising scheme of system controller S, this query is answered in the negative. With no identifier present, system controller S at frame set servers T supplies a browser identifier and ad address at supply identifier and ad address step 112. Thereafter, browser B installs browser identifier at install browser identifier step 114. Finally, and using the supplied ad address, browser B undertakes to fetch ad content 16 at fetch ad content step 116.

Once the browser identifier is installed, browser B steps through display and timer start step 106, timer timeout step 108, and identifier present step 110. At this latter query, the answer is in the affirmative. Thereafter browser B calls system controller S at frame set servers T and executes report browser identity, ad identity, and timeout step 118. In return for this report, browser B receives from system controller S at frame set servers T the next ad address at receive ad address step 120. From there, an endless logic loop through fetch ad content step 116, timer timeout step 108, call system controller step 109, identifier present step 110, and finally report browser identity, ad identity, and timeout step 118 occurs.

Finally, there is included an Appendix, not printed but a part of this application's record file, to this application sample code for the installation and running of the advertising scheme here shown.

In Section I, the code necessary for the installation of non-scrolling ad frame 24 is shown. The reader will appreciate the brevity of this code. Since down loading of the WebPages is interrupted while the code for the non-scrolling ad frame 24 is installed, it is important that this code be as brief as possible.

In Section II, code for a typical lead-in ad is shown. This is the only ad code that is loaded from the advertiser webserver C to browser B. In this example, a timer is not present. However, a typical timer is shown in the code of Section III.

In Section III, the code transmitted for ad content 16 is shown. The address to obtain the ad content is labeled. Likewise, the timer code is labeled. Finally, the return address to obtain the next batch of similar code on a recursive basis is shown. The reader will understand that once "timeout" has occurred, the code of Section III will be trashed and replaced with new code for the next ordered ad content 16 from system controller S at frame set servers T.

In summary, an interactive advertising scheme has been illustrated which uses mainly the logic of the system controller S and the otherwise idle distributed intelligence of the inquiring browser B. It is to be emphasized that the task of the advertiser webserver C is held to a minimum.

What is claimed is:

1. A non-scrolling ad display from a website for causing a browser hitting the website to undertake centrally controlled and recorded ad display for guaranteed minimum timed intervals comprising the steps of:

providing a website at a webserver for transmitting at least one page with a non-scrolling ad frame to a browser;

providing ad content for the non-scrolling ad frame, each ad content having ad identity and an individual timer for timing out commencing with display at the browser and an Internet address for fetching by the browser;

providing a central controller interrogating for browser identity and maintaining records associated with the browser identity indicating ad identity displayed, and timer timeout;

placing the ad content in the non-scrolling ad frame of the browser to display the ad content and start the individual timer;

timing out the individual timer of the ad content at the non-scrolling frame at the browser;

reporting from the browser to the central controller the timer timeout of the ad content; and, retaining in the central controller a record of the browser identity, the ad identity, and the timer timeout of the ad content at the browser.

2. The non-scrolling ad display from a website for causing a browser hitting the website to undertake centrally controlled and recorded ad display according to claim 1 and wherein:

the step of providing a website at a webserver for transmitting at least one page with a non-scrolling ad frame to a browser further includes:

having the website transmit code to the browser to interrogate the browser for the presence of the non-scrolling ad frame; and, upon not finding a non-scrolling ad frame at the browser, diverting the browser to central controller; and, having the central controller directly provide to the browser the non-scrolling ad frame.

3. The non-scrolling ad display from a website for causing a browser hitting the website to undertake centrally controlled and recorded ad display according to claim 1 and wherein:

the step of providing ad content for the non-scrolling ad frame includes providing the browser with an internet address of the ad content; and, having the browser retrieve the ad content from the provided internet address.

4. The non-scrolling ad display from a website for causing a browser hitting the website to undertake centrally controlled and recorded ad display according to claim 3 and wherein:

the step of providing the browser with an internet address of the ad content includes having the central system controller provide the internet address of the ad content.

5. The non-scrolling ad display from a website for causing a browser hitting the website to undertake centrally controlled and recorded ad display according to claim 4 and wherein:

providing from the system controller the internet address of ad content to be displayed after reporting from the browser to the central controller the timer timeout of the ad content.

6. A non-scrolling ad display from a website for causing a browser hitting the website to undertake centrally controlled and recorded ad display for guaranteed minimum timed intervals comprising the steps of:

providing a website at a webserver for transmitting at least one page to a browser;

providing code at the website for transmission to the browser for interrogating the browser to determine presence of a non-scrolling ad frame in the browser for the display of ad content;

interrogating the browser for the presence of the non-scrolling frame;

upon not finding the non-scrolling ad frame, diverting the browser to an internet address for loading the non-scrolling ad frame;

upon finding the non-scrolling ad frame providing ad content for the non-scrolling ad frame, each ad content having ad identity and an individual timer for timing out commencing with display at the browser and an Internet address for fetching by the browser;

providing a central controller interrogating for browser identity and maintaining records associated with the browser identity indicating ad identity displayed, and timer timeout;

placing the ad content in the non-scrolling ad frame of the browser to display the ad content and start the individual timer;

timing out the individual timer of the ad content at the non-scrolling frame at the browser;

reporting from the browser to the central controller the timer timeout of the ad content; and, retaining in the central controller a record of the browser identity, the ad identity, and the timer timeout of the ad content at the browser.

7. The non-scrolling ad display from a website for causing a browser hitting the website to undertake centrally controlled and recorded ad display according to claim 6 and wherein:

the step of providing a central controller interrogating for browser identity includes;

providing a generator for generating unique browser identifiers at the system controller;

transmitting the unique browser identifier to the browser; and, interrogating for unique browser identifiers to the browser from the system controller to uniquely identify the browser.

8. The non-scrolling ad display from a website for causing a browser hitting the website to undertake centrally controlled and recorded ad display according to claim 6 and wherein:

the step of providing the ad content in the non-scrolling ad frame of the browser includes having the central controller send the browser the internet address of the ad content; and, having the browser retrieve the ad content from the internet using the Internet address.

9. A non-scrolling ad display from a website for causing a browser hitting the website to undertake centrally controlled and recorded ad display for guaranteed minimum timed intervals comprising the steps of:

providing a website at a webserver for transmitting at least one page with code for installing a non-scrolling ad frame to a browser;

providing a plurality of classed ad contents for the non-scrolling ad frame, each ad content being from a plurality of similarly classified ad contents with each ad content having ad identity, an individual timer for timing out commencing with display at the browser and an Internet address for fetching by the browser;

providing a central controller interrogating for browser identity and maintaining records associated with the browser identity indicating ad identity displayed, and timer timeout;

placing the ad content in the non-scrolling ad frame of the browser to display the ad content and start the individual timer;

timing out the individual timer of the ad content at the non-scrolling frame at the browser;

reporting from the browser to the central controller the timer timeout of the ad content;

retaining in the central controller a record of the browser identity, the ad identity, and the timer timeout of the ad content at the browser;

retrieving the record of browser identity, the ad identity, and timer timeout;

changing the plurality of similarly classified ad contents with the ad identity of the timer timeout ad; and, transmitting to the reporting browser an address of similarly classified ad contents less the ad identity of the timer timeout ad;

repeating the placing, timing out reporting, retaining, retrieving, changing, and transmitting steps until all similarly classified ad contents have been displayed.

10. A non-scrolling ad display from a website for causing a browser hitting the website to undertake centrally controlled and recorded ad display for guaranteed minimum timed intervals according to claim 9 and wherein:

the step of providing a plurality of classed ad contents for the non-scrolling ad frame includes a plurality of ad content being from a first similarly classified ad contents and a plurality of ad contents being from a second similarly classified ad contents; and, repeating the placing, timing out reporting, retaining, retrieving, changing, and transmitting steps until first similarly classified ad contents is displayed; and then, repeating the placing, timing out reporting, retaining, retrieving, changing, and transmitting steps until the second similarly classified ad contents for the non-scrolling ad frame is displayed.

11. The process of using a browser in a scheme of precise timed ad display control wherein the internet includes:

a website at a webserver for transmitting at least one page with a non-scrolling ad frame to a browser;

ad content for the non-scrolling ad frame, each ad content having ad identity and an individual timer for timing out commencing with display at the browser and an Internet address for fetching by the browser; and, a central controller interrogating for browser identity and maintaining records associated with the browser identity indicating ad identity displayed, and timer timeout;

the process of using the browser comprising the steps of:

having the browser call the website;

having the browser retrieve the at least one page of the website and a non-scrolling ad frame at the browser;

having the browser then display ad content in the non-scrolling ad frame to start the timer;

having the browser display the ad content a sufficient interval to timeout the timer in the ad content;

having the browser report to the central controller a record of the browser identity, the ad identity, and the timer timeout of the ad content at the browser.

12. The process of using a browser in a scheme of precise timed ad display control according to claim 11 and wherein:

the step of having the browser retrieve the at least one page of the website with the non-scrolling ad frame includes:

interrogating the browser for the presence of the non-scrolling ad frame;

upon not finding the non-scrolling ad frame diverting the browser to load the non-scrolling ad frame from an address on the Internet different from the website;

upon finding the non-scrolling ad frame having the browser display the ad content.

13. The process of using a browser in a scheme of precise timed ad display control according to claim 11 and wherein:

the step of having the browser then display ad content in the non-scrolling ad frame to start the timer includes:

having the browser retrieve the internet address of the ad content;

using the Internet address of the ad content, having the browser retrieve the ad content;

displaying the retrieved ad content to start the timer.

14. A process of using a website and webserver in a scheme of precise timed ad display control wherein the Internet includes:

a website at a webserver for transmitting at least one page with code for installing a non-scrolling ad frame to a browser;

ad content for the non-scrolling ad frame, each ad content having ad identity and an individual timer for timing out commencing with display at the browser and an Internet address for fetching by the browser; and, a central controller interrogating for browser identity and maintaining records associated with the browser identity indicating ad identity displayed, and timer timeout; and, an interrogating browser for calling on the webserver of the website for retrieving the at least one page with the non-scrolling ad frame and displaying the at least one page with non-scrolling frame;

the process of using the website and webserver to place a overlaid non-scrolling ad frame at the browser only and not at the website and webserver comprising the steps of:

upon receiving a request for the at least one web page from a browser transmitting to the browser code for determining whether the inquiring browser has a non-scrolling ad frame;

upon determining that the inquiring non-scrolling ad frame is not present at the browser, transmitting from the transmitted code to the inquiring browser an address other than the website for the loading of the non-scrolling ad frame to the browser;

upon determining that the inquiring non-scrolling ad frame is present in the webpage at the browser, proceeding to load the web page to the browser, whereby the browser only contains the non-scrolling ad frame and the website and webserver do not contain the non-scrolling ad frame giving to a viewer of the browser the overlaid appearance of the non-scrolling ad frame on the website and webserver.

15. A process of using a website and webserver in a scheme of precise timed ad display control according to claim 14 wherein the Internet includes:

placing lead-in ad content to the non-scrolling ad frame on the browser, the lead-in ad content having ad identity and an individual timer for timing out commencing with display at the browser.

16. A process of using a central system controller in a scheme of precise timed ad display control wherein the internet includes:

a website at a webserver for transmitting at least one page with code for installing a non-scrolling ad frame to a browser;

ad content for the non-scrolling ad frame, each ad content having ad identity and an individual timer for timing out commencing with display at the browser and an Internet address for fetching by the browser; and, a central controller interrogating for browser identity and maintaining records associated with the browser identity indicating ad identity displayed, and timer timeout; and, an interrogating browser for calling on the webserver of the website for retrieving the at least one page with the non-scrolling ad frame and displaying the at least one page with non-scrolling frame;

the process of using the central system controller comprising the steps of:

receiving requests for ad content address from a browser;

upon receiving the requests for ad content address, inquiring of the browser for a unique browser identifier;

upon failing to find a unique browser identifier, generating and transmitting to the browser the unique browser identifier;

upon finding a unique browser identifier, transmitting to the browser the address of ad content for display at the browser.

17. The process of using a central system controller in a scheme of precise timed ad display control according to claim 16 and wherein:

the step of upon finding a unique browser identifier, transmitting to the browser the address of ad content for display at the browser includes;

transmitting to the browser the internet address of the ad content; and, permitting the browser to retrieve the ad content independent of the system controller.

18. A process of using a central system controller in a scheme of precise timed ad display control wherein the internet includes:

a website at a webserver for transmitting at least one page with code for installing a non-scrolling ad frame to a browser;

a plurality of classed ad contents for the non-scrolling ad frame, each ad content being from a plurality of similarly classified ad contents with each ad content having ad identity, an individual timer for timing out commencing with display at the browser and an Internet address for fetching by the browser; and, a central controller interrogating for browser identity and maintaining records associated with the browser identity indicating ad identity displayed, and timer timeout; and, an interrogating browser for calling on the webserver of the website for retrieving the at least one page with the non-scrolling ad frame and displaying the at least one page with non-scrolling frame;

the process of using the central system controller comprising the steps of:

maintaining in the central controller a record of the browser identity, the ad identity, and the timer timeout of the ad content at the browser;

receiving the record of browser identity, the ad indentity, and timer timeout;

changing the plurality of similarly classified ad contents with the ad identity of the timer timeout ad; and, transmitting to the reporting browser an address of similarly classified ad contents less the ad identity of the timer timeout ad.

19. The process of using a central system controller in a scheme of precise timed ad display control according to claim 18 and having the additional step of:

repeating the maintaining, receiving, changing, and transmitting steps until all similarly classified ad contents have been displayed.

* * * * *

US006128651C1

(12) EX PARTE REEXAMINATION CERTIFICATE (9594th)
United States Patent
Cezar

(10) Number: US 6,128,651 C1
(45) Certificate Issued: Apr. 12, 2013

(54) INTERNET ADVERTISING WITH CONTROLLED AND TIMED DISPLAY OF AD CONTENT FROM CENTRALIZED SYSTEM CONTROLLER

(75) Inventor: Robert M. Cezar, Arroyo Grande, CA (US)

(73) Assignee: Klaustech, Inc., Plano, TX (US)

Reexamination Request:
No. 90/011,303, Oct. 27, 2010

Reexamination Certificate for:
Patent No.: 6,128,651
Issued: Oct. 3, 2000
Appl. No.: 09/291,785
Filed: Apr. 14, 1999

(51) Int. Cl.
*G06Q 30/00* (2006.01)

(52) U.S. Cl.
USPC .......................................................... 709/217

(58) Field of Classification Search ................. 709/217
See application file for complete search history.

(56) References Cited

To view the complete listing of prior art documents cited during the proceeding for Reexamination Control Number 90/011,303, please refer to the USPTO's public Patent Application Information Retrieval (PAIR) system under the Display References tab.

*Primary Examiner* — Jeffrey D. Carlson

(57) ABSTRACT

A non-scrolling ad display is lodged in a website to cause browsers hitting the website to undertake centrally controlled and recorded ad display for guaranteed minimum timed intervals. The system enables precise controlled advertising to each web page viewing browser and accurate advertising budgeting and programming which can be monitored and upgraded to meet marketing needs. The components participating in the system include a website at a webserver for transmitting a page with code for installing a non-scrolling ad frame. Ad content for the non-scrolling ad frame each have individual timers for timing out commencing with display at the browser and an Internet address for fetching by the browser. A central controller with a firewall protected data base directs non-scrolling frame set up in the browser; generates, dispenses and interrogates for unique browser identifiers; maintains records associated with the unique browser identifiers indicating ads displayed and ads available for display; and, finally dispatches to inquiring browsers ad content addresses. The data base provides an audit trail from which websites can be compensated for ad display and advertisers billed for the ad display. Finally, an inquiring browser has the non-scrolling frame set up on the browser, ad content displayed within the browser for a sufficient time interval to timeout the timer, report to the central controller of the display, and retrieval of the address of the next ad content for display.

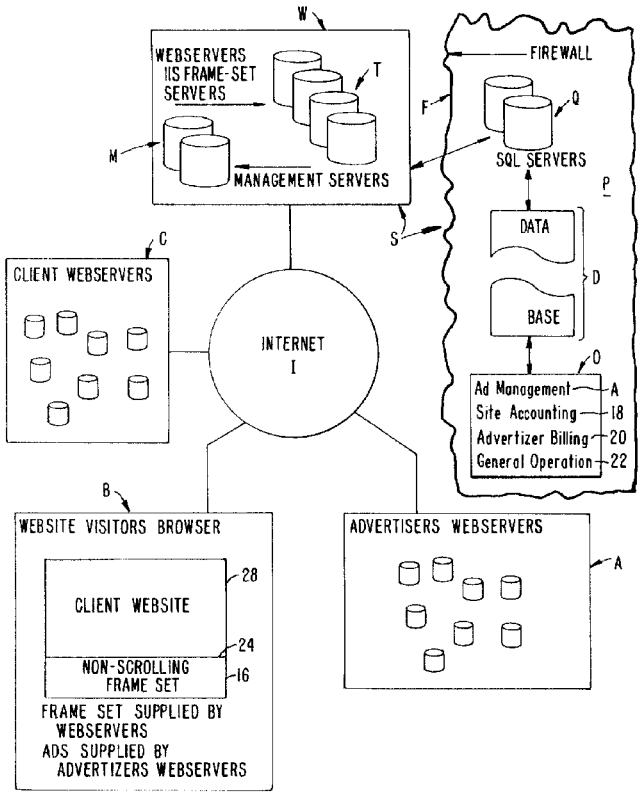

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-8 and 11-19 are cancelled.

Claims 9-10 are determined to be patentable as amended.

New claims 20-31 are added and determined to be patentable.

9. A non-scrolling ad display from a website for causing a browser hitting the website to undertake centrally controlled and recorded ad display for guaranteed minimum timed intervals comprising the steps of:
   providing a website at a webserver for transmitting at least one page with code for installing a non-scrolling ad frame to a browser;
   providing a plurality of classed ad contents for the non-scrolling ad frame, each ad content being from a plurality of similarly classified ad contents with each ad content having ad identity, an individual timer for timing out commencing with display at the browser and an Internet address for fetching by the browser;
   providing a central controller interrogating for browser identity and maintaining records associated with the browser identity indicating ad identity displayed, and timer timeout;
   placing the ad content in the non-scrolling ad frame of the browser to display the ad content and start the individual timer;
   timing out the individual timer of the ad content at the non-scrolling frame at the browser;
   reporting from the browser to the central controller the timer timeout of the ad content;
   retaining in the central controller a record of the browser identity, the ad identity, and the timer timeout of the ad content at the browser;
   retrieving the record of browser identity, the ad identity, and timer timeout;
   changing the plurality of similarly classified ad contents with the ad identity of the timer timeout ad; and,
   transmitting to the reporting browser an address of similarly classified ad contents less the ad identity of the timer timeout ad;
   repeating the placing, timing out, reporting, retaining, retrieving, changing, and transmitting steps until all similarly classified ad contents have been displayed, *the placing, timing out, reporting, and transmitting steps being repeated in sequential order for each of the plurality of similarly classified ad contents.*

10. A non-scrolling ad display from a website for causing a browser hitting the website to undertake centrally controlled and recorded ad display for guaranteed minimum timed intervals according to claim 9 and wherein:
    the step of providing a plurality of classed ad contents for the non-scrolling ad frame includes a plurality of ad content being from a first similarly classified ad contents and a plurality of ad contents being from a second similarly classified ad contents; and,
    repeating the placing, timing out, reporting, retaining, retrieving, changing, and transmitting steps *for each of the plurality of ad contents of the first similarly classified ad contents* until *all of the* first similarly classified ad contents [is] *for the non-scrolling ad frame have been* displayed, *the placing, timing out, reporting, and transmitting steps for each of the plurality of ad contents of the first similarly classified ad contents being repeated in sequential order*; and then,
    repeating the placing, timing out, reporting, retaining, retrieving, changing, and transmitting steps *for each of the plurality of ad contents of the second similarly classified ad contents* until *all of* the second similarly classified ad contents for the non-scrolling ad frame [is] *have been* displayed, *the placing, timing out, reporting, and transmitting steps for each of the plurality of ad contents of the second similarly classified ad contents being repeated in sequential order.*

*20. A non-scrolling ad display from a website for causing a browser hitting the website to undertake centrally controlled and recorded ad display for guaranteed minimum timed intervals comprising the steps of:*
   *providing a website at a webserver for transmitting at least one page with a non-scrolling ad frame to a browser;*
   *providing ad content for the non-scrolling ad frame, each ad content having ad identity and an individual timer for timing out commencing with display at the browser and an Internet address for fetching by the browser;*
   *providing a central controller interrogating for browser identity and maintaining records associated with the browser identity indicating ad identity displayed, and timer timeout;*
   *placing the ad content in the non-scrolling ad frame of the browser to display the ad content and start the individual timer;*
   *timing out the individual timer of the ad content at the non-scrolling frame at the browser;*
   *reporting from the browser to the central controller the timer timeout of the ad content;*
   *retaining in the central controller a record of the browser identity, the ad identity, and the timer timeout of the ad content at the browser; and*
   *transmitting to the reporting browser an Internet address for new ad content for placement in the non-scrolling ad frame in response to receipt of the timer timeout report at the central controller.*

*21. The non-scrolling ad display from a website for causing a browser hitting the website to undertake centrally controlled and recorded ad display according to claim 20 further comprising:*
   *repeating in sequential order the placing, timing out, and reporting steps for the new ad content.*

*22. The non-scrolling ad display from a website for causing a browser hitting the website to undertake centrally controlled and recorded ad display according to claim 20 and wherein:*
   *the step of providing a website at a webserver for transmitting at least one page with a non-scrolling ad frame to a browser further includes:*
   *having the website transmit code to the browser to interrogate the browser for the presence of the non-scrolling ad frame; and,*
   *upon not finding a non-scrolling ad frame at the browser, diverting the browser to the central controller; and,* having the central controller directly provide to the browser the non-scrolling ad frame.

23. The non-scrolling ad display from a website for causing a browser hitting the website to undertake centrally controlled and recorded ad display according to claim 20 and wherein:
the step of providing ad content for the non-scrolling ad frame includes providing the browser with an internet address of the ad content; and,
having the browser retrieve the ad content from the provided Internet address.

24. The non-scrolling ad display from a website for causing a browser hitting the website to undertake centrally controlled and recorded ad display according to claim 23 and wherein:
the step of providing the browser with an internet address of the ad content includes having the central controller provide the internet address of the ad content.

25. A non-scrolling ad display from a website for causing a browser hitting the website to undertake centrally controlled and recorded ad display for guaranteed minimum timed intervals comprising the steps of:
providing a website at a webserver for transmitting at least one page with a non-scrolling ad frame to a browser;
providing ad content for the non-scrolling ad frame, each ad content having ad identity and an individual timer for timing out commencing with display at the browser and an Internet address for fetching by the browser;
providing a central controller interrogating for browser identity and maintaining records associated with the browser identity indicating ad identity displayed, and timer timeout;
placing the ad content in the non-scrolling ad frame of the browser to display the ad content and start the individual timer, and displaying the ad content at the same time with the at least one page of the website;
timing out the individual timer of the ad content at the non-scrolling frame at the browser;
reporting from the browser to the central controller the timer timeout of the ad content;
retaining in the central controller a record of the browser identity, the ad identity, and the timer timeout of the ad content at the browser; and
transmitting to the reporting browser an Internet address for new ad content for placement in the non-scrolling ad frame in response to receipt of the timer timeout report at the central controller, wherein the ad content and the new ad content are displayed successively in the non-scrolling ad frame independent of any user input.

26. The non-scrolling ad display from a website for causing a browser hitting the website to undertake centrally controlled and recorded ad display according to claim 25 further comprising:
repeating in sequential order the placing, timing out, and reporting steps for the new ad content.

27. The non-scrolling ad display from a website for causing a browser hitting the website to undertake centrally controlled and recorded ad display according to claim 25 and wherein:
the step of providing a website at a webserver for transmitting at least one page with a non-scrolling ad frame to a browser further includes:
having the website transmit code to the browser to interrogate the browser for the presence of the non-scrolling ad frame; and,
upon not finding a non-scrolling ad frame at the browser, diverting the browser to the central controller; and,
having the central controller directly provide to the browser the non-scrolling ad frame.

28. The non-scrolling ad display from a website for causing a browser hitting the website to undertake centrally controlled and recorded ad display according to claim 25 and wherein:
the step of providing ad content for the non-scrolling ad frame includes providing the browser with an internet address of the ad content; and,
having the browser retrieve the ad content from the provided internet address.

29. The non-scrolling ad display from a website for causing a browser hitting the website to undertake centrally controlled and recorded ad display according to claim 28 and wherein:
the step of providing the browser with an internet address of the ad content includes having the central controller provide the internet address of the ad content.

30. The non-scrolling ad display from a website for causing a browser hitting the website to undertake centrally controlled and recorded ad display according to claim 9 and wherein:
the step of providing the plurality of classed ad contents for the non-scrolling ad frame includes providing the browser with an internet address of each of the ad contents; and,
having the browser retrieve the ad contents from the provided internet addresses.

31. The non-scrolling ad display from a website for causing a browser hitting the website to undertake centrally controlled and recorded ad display according to claim 30 and wherein:
the step of providing the browser with an internet address of each of the ad contents includes having the central controller provide the internet addresses of the ad contents.

* * * * *